United States Patent [19]

Hargis et al.

[11] Patent Number: 5,796,766
[45] Date of Patent: Aug. 18, 1998

[54] OPTICALLY TRANSPARENT HEAT SINK FOR LONGITUDINALLY COOLING AN ELEMENT IN A LASER

[75] Inventors: David E. Hargis, La Jolla; Sven E. Nelte, Carlsbad, both of Calif.

[73] Assignee: Laser Power Corporation, San Diego, Calif.

[21] Appl. No.: 784,051

[22] Filed: Jan. 17, 1997

Related U.S. Application Data

[63] Continuation-in-part of Ser. No. 731,823, Oct. 21, 1996, abandoned, which is a continuation of Ser. No. 295,006, Oct. 23, 1994, Pat. No. 5,574,740.

[51] Int. Cl.$^6$ ............................................. H01S 3/04
[52] U.S. Cl. ............................ 372/36; 372/92; 372/98
[58] Field of Search ........................ 372/34, 36, 92, 372/98

[56] References Cited

U.S. PATENT DOCUMENTS

| | | | |
|---|---|---|---|
| 4,731,787 | 3/1988 | Fan et al. | 372/22 |
| 4,739,507 | 4/1988 | Byer et al. | 372/22 |
| 4,791,631 | 12/1988 | Baumert et al. | 372/22 |
| 4,797,893 | 1/1989 | Dixon | 372/66 |
| 4,809,291 | 2/1989 | Byer et al. | 372/75 |
| 4,847,851 | 7/1989 | Dixon | 372/75 |
| 4,860,304 | 8/1989 | Mooradian | 372/92 |
| 4,872,177 | 10/1989 | Baer et al. | 372/75 |
| 4,879,722 | 11/1989 | Dixon et al. | 372/21 |
| 4,879,723 | 11/1989 | Dixon et al. | 372/21 |
| 4,933,947 | 6/1990 | Anthon et al. | 372/34 |
| 4,942,582 | 7/1990 | Kintz et al. | 372/18 |
| 4,953,166 | 8/1990 | Mooradian | 372/21 |
| 4,982,405 | 1/1991 | Zayhowski et al. | 372/10 |
| 5,022,745 | 6/1991 | Zayhowski et al. | 350/608 |
| 5,063,566 | 11/1991 | Dixon | 372/22 |

(List continued on next page.)

FOREIGN PATENT DOCUMENTS

| | | |
|---|---|---|
| 0455383 | 11/1991 | European Pat. Off. |
| A 4283977 | 10/1992 | Japan |
| A 4291976 | 10/1992 | Japan |

OTHER PUBLICATIONS

Byer, R. (1989) Diode laser-pumped solid-state lasers. Science 239:742–747.

Dorozhkin, L., et al. (1981) Optical second-harmonic generation in a new nonlinear active medium . . . Sov. Tech. Phys. Lett. 7:555–556.

Dimitriev, V., et al. (1979) Simultaneous emission at the fundamental frequency and the second harmonic . . . Sov Tech. Phys. Lett., 5(11):590.

(List continued on next page.)

Primary Examiner—Leon Scott, Jr.
Attorney, Agent, or Firm—Knobbe, Martens, Olson & Bear, LLP

[57] ABSTRACT

A longitudinally-cooled laser element assembly comprises an optically transparent heat sink (OTH) coupled to a laser element and a heat sink. An etalon structure including a first flat surface and a second, substantially parallel flat surface is formed in the laser element and/or the OTH. In some embodiments, a balanced etalon is provided by forming a reflector on the second flat surface of the etalon that has a reflectivity approximately equal to the Fresnel loss at the interface between the OTH and the laser element. In some embodiments the laser element assembly includes a second OTH coupled to the laser element at a second interface, thereby defining a second Fresnel loss. Preferably, the second OTH has an index of refraction substantially equal to the index of refraction of the first OTH, so that said first and second Fresnel losses are approximately equal and a balanced etalon is formed. In some embodiments the laser element comprises a solid-state gain medium. In other embodiments the laser element comprises a nonlinear frequency conversion crystal. An intracavity frequency-converted laser is described in which OTHs are used to cool both the gain medium and the nonlinear material.

31 Claims, 4 Drawing Sheets

U.S. PATENT DOCUMENTS

| | | | |
|---|---|---|---|
| 5,070,505 | 12/1991 | Dixon | 372/22 |
| 5,115,445 | 5/1992 | Mooradian | 372/75 |
| 5,164,947 | 11/1992 | Lukas et al. | 372/22 |
| 5,222,088 | 6/1993 | Amano | 372/22 |
| 5,287,381 | 2/1994 | Hyuga et al. | 372/75 |
| 5,331,650 | 7/1994 | Maeda et al. | 372/26 |
| 5,441,803 | 8/1995 | Meissner | 428/220 |
| 5,511,085 | 4/1996 | Marshall | 372/22 |

OTHER PUBLICATIONS

Fan, T., et al. (1986) Nd:MgO:LiNbO$_3$ spectroscopy and laser devices. J. Opt. Soc. Am. 3(1):140–147.

Jensen, T., et al. (1994) Spectroscopic characterization and laser performance of . . . Appl. Phys. B. 58:373–379.

Lin, J.T. (1989) Progress Report: Diode pumping and frequency conversion. Lasers & Optronics 61–66.

Lin, J.T. (1990) Doubled jeopardy: the blue-green race's new players. Lasers & Optronics 34–40.

Lu, B., et al. (1986) Excited emission and self-frequency-doubling effect of . . . Chinese Phys. Lett. 3(9):413–416.

Nabors, C., et al. (1992) High-power, continuous-wave, Nd:YAG microchip laser array. Optics Letters 17(22):1587–1589.

Payne, S., et al. (1992) 752 nm wing-pumped Cr:LiSAF laser. IEEE Journal of Quantum Electronics 28(4):1188–1196.

Risk, W., et al. (1989) Diode laser pumped blue light source at 473nm using intracavity frequency doubling of a 946 nm Nd:YAG laser. Appl. Phys. Lett. 54(17):1625–1627.

Sasaki, T., et al. (1991) Single-longitudinal mode operation and second-harmonic generation of Nd:YVO$_4$ microchip lasers. Optics Letters 16(21):1665–1667 (1991).

Schutz, L., et al. (May 23, 1990) Self-frequency doubling Nd:YAB laser pumped by a diode laser. CLEO–90, paper CWC4.

Tatsuno, K., et al. (May 1992) Highly efficient and stable green microlaser consisting of Nd:YVO$_4$ with interactivity KTP for optical storage. CLEO 92, Paper CW08.

Wang, S., et al. (1990) Characteristics of neodymium yttrium aluminum borate as a diode-pumped laser material Topical Mtng. on Advance Lasers, Session TuB4 pp.23–25.

Yaney, P., et al. (1976) Spectroscopic studies and analysis of the laser states of Nd$^3$ in YVO$_4$. J. Opt. Soc. Am. 66(12):1405–1414.

Zagumennyl, A., et al. (1992) The ND:GdVO$_4$ crystal: a new material for diode-pumped lasers. Sov. J. Quantum Electron 22(12):1071–1072.

Zayhowski, J. (1990) Microchip lasers. The Lincoln Laboratory Journal 3(3):427–445.

Patent Abstract No. A 4291976. Abstract date Mar. 3, 1993 vol. 17 No. 104.

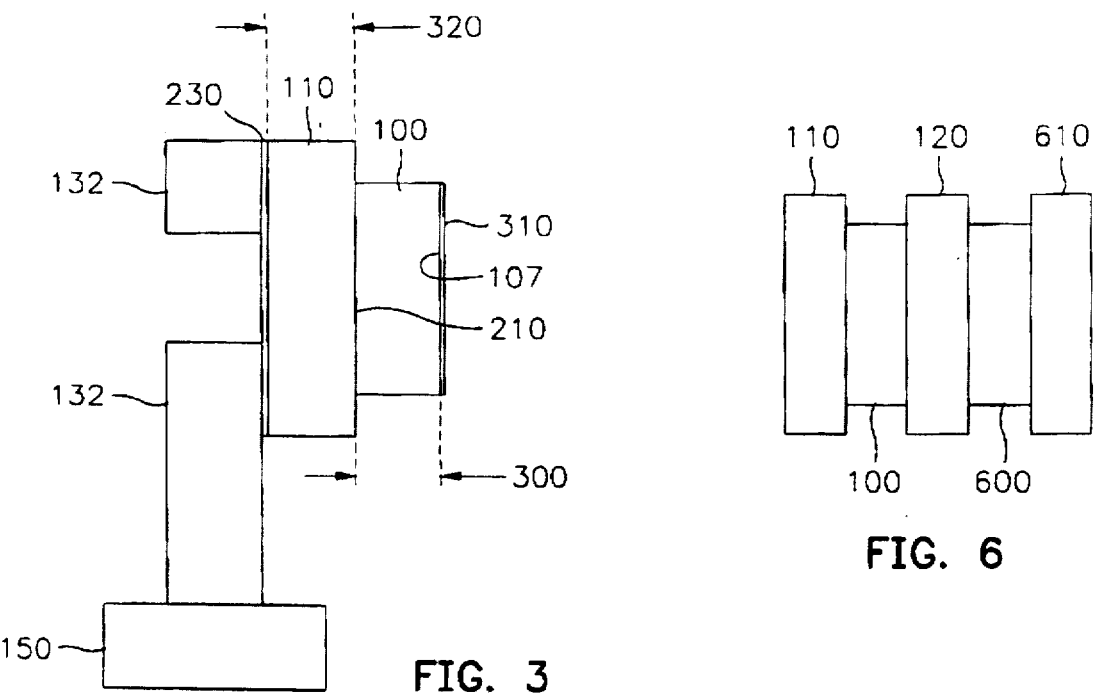
FIG. 3
FIG. 6
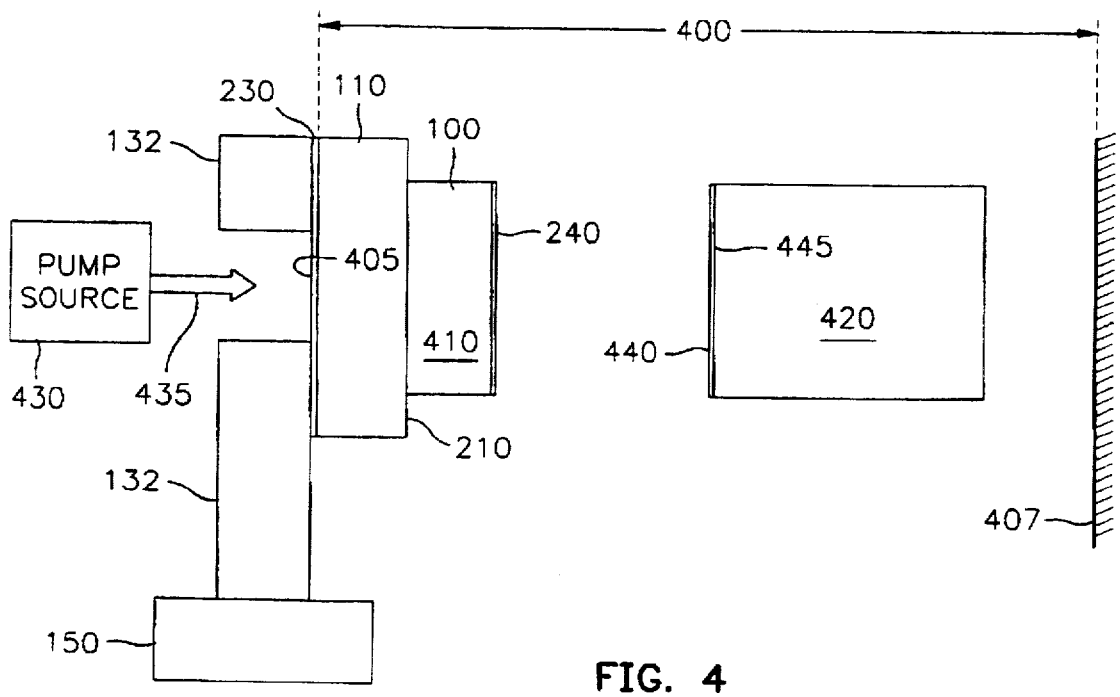
FIG. 4

OPTICALLY TRANSPARENT HEAT SINK FOR LONGITUDINALLY COOLING AN ELEMENT IN A LASER

This application is a continuation-in-part of application Ser. No. 08/731,823, filed on Oct. 21, 1996, now abandoned, which is a continuation of Ser. No. 08/295,006 filed Oct. 23, 1994, U.S. Pat. No. 5,574,740, which was issued Nov. 12, 1996.

BACKGROUND OF THE INVENTION

1. Field of the Invention

The present invention relates to lasers, and particularly to cooling systems for elements of a solid-state laser.

2. Description of Related Art

The fundamental components of a laser include an optical cavity, a gain medium situated therein, and an energy source for pumping the gain medium. One important type of laser is a diode-pumped solid-state laser, which includes a solid-state gain medium pumped by optical radiation from a laser diode. A variety of important applications have motivated research into diode-pumped solid-state lasers, including laser display systems, optical data storage, medical instrumentation, and communications. For small to moderate levels of optical power, one particularly useful diode-pumped solid-state laser is a microlaser, which comprises a short element (i.e. less than about five mm) of solid-state gain medium positioned in a resonant cavity. The pump beam is supplied by a semiconductor diode laser, which pumps the solid-state gain medium to provide energy to support laser operation within the resonant cavity. Two opposing reflective surfaces define the resonant cavity within which the gain medium is disposed. The opposing reflective surfaces can be formed directly on opposing ends of the solid-state gain medium, and the resulting structure is compact and reliable.

Optically-pumped solid-state lasers have many advantages relative to other lasers, including high efficiency, small size, and low cost. However, problems still exist; for example, high temperatures within any of the optical elements can adversely affect performance. Within the gain medium, heat is unavoidably produced during absorption of optical pumping radiation, and to a much lesser extent, heat is produced by absorption of lasant radiation. Temperature buildup is particularly a problem during continuous wave (cw) operation as opposed to pulsed operation, because there is no "off" part of the cycle to dissipate heat. At high pumping intensities, significant heating of the lasing volume can occur, leading to destruction of the gain medium due to thermal stresses beyond the fracture limit of the gain medium. In addition to thermal stresses, heating in some lasers can lead directly to poor efficiency and reduction of output power, and severe heating can cause an inability to achieve lasing operation. For example, in quasi-three level lasers, high temperatures increase the population at the lower laser level, causing a decrease in the population inversion between the upper laser level and the lower laser level, which reduces gain, increases the lasing threshold, and lowers efficiency of energy conversion. Additionally, heating can cause optical distortion of the laser emission within the cavity due to thermal and stress-induced birefringence. In some types of gain media, an increase in laser temperature causes a significant reduction in emission cross-section and/or fluorescence lifetime.

Due to the adverse effects of high temperatures, it is important to effectively transfer heat away from the interior of the solid-state gain medium. Prior configurations provide such heat transfer by mounting the solid-state gain medium on a thermally conductive heat sink, such as copper, which is then thermally coupled to a thermoelectric cooler or another cooling device that has sufficient cooling power to hold the heat sink at a constant temperature. However, regardless of the heat sink's temperature, the gain medium's temperature can still be unacceptably high due to poor thermal conductivity of the gain medium. Because many solid-state gain media are poor thermal conductors, a large temperature difference can develop between the material within the lasing mode volume and the heat sink. For example Nd:YVO$_4$ has a thermal conductivity of 5.2 W/m-°C., which is low compared with better thermal conductors such as copper (about 300 W/m-°C.), sapphire (about 40 W/m-°C.) and even YAG (about 19 W/m-°C.). As a result, the physical distance between the lasing mode volume and the heat sink material greatly affects the temperature of the mode volume within the solid-state gain medium. As this distance is reduced, the temperature within the lasing volume can be more effectively controlled by the heat sink.

One common method for cooling solid-state lasers uses a "side-cooled" configuration, in which the solid-state gain medium has a cylindrical rod shape and a heat sink is connected around the perimeter of the cylinder. However, it can be difficult to effectively cool a solid-state gain medium using side-cooled configurations, particularly if the gain medium has a very short length. For example, a 1.0 mm thick gain crystal has very little surface area around its perimeter, allowing only a small area to connect the heat sink and making it difficult to side cool effectively. Furthermore, effective side cooling can be difficult because the heat sink must be kept apart from the lasing mode volume (which is the source of heat) by a predetermined amount, in order to avoid optical diffraction losses from the aperture defined by the heat sink. Particularly, for intracavity heat sinks, the lasing spot diameter should be less than one-third of the lateral dimensions of the solid-state laser material, including the heat sink, to avoid diffraction losses to the beam passing therethrough; i.e. the solid-state laser material should have a diameter at least three times as large as the lasing mode diameter. Thus, heat must flow a significant distance through the solid-state laser material before reaching the heat sink, which can give rise to a large temperature difference between the lasing spot and the heat sink. This large temperature difference can be substantial (e.g. 200°–300° C.) and the resulting high temperature can severely diminish the laser's performance.

In another heat sink configuration, two heat sinks are used, one on each side of the solid-state gain medium. Each heat sink has an aperture to allow passage of a laser beam, so that the pump beam passes through the aperture on one of the heat sinks, and the laser emission passes through the aperture on the other heat sink. In some embodiments, only one heat sink is utilized, which is positioned on the pump side. Using either configuration, the apertures in the two heat sinks must be larger than the laser beam diameter in order to avoid diffraction losses, and therefore the distance the heat must flow is undesirably large. As discussed above, if the laser emission passes through a heat sink aperture, then that aperture should have a diameter approximately three times the diameter of the laser emission. For example, in high power solid-state laser systems the lasing mode diameter can approach 400 µm, thus requiring heat sink aperture diameters greater than 1.2 mm.

Nabors et al. in "High-power, continuous-wave Nd:YAG microchip laser array", *Optics Letters*, Vol. 17, No. 22 of Nov. 15, 1992, p. 1587, discloses a system for cooling a microchip laser. Nabors discloses a sapphire heat sink that is thermally coupled to a piece of solid-state Nd:YAG laser material (a "laser microchip") on the end opposite to the pumping end. According to Nabors et al., the geometry of the sapphire heat sink was chosen to promote longitudinal heat flow and to minimize large-scale transverse thermal gradients and edge effects in the microchip laser, which tend to destablilize and smear out the spatial modes. Nabors et al. disclose that the microchip laser's pump side is coated with a high-reflector dielectric stack that is highly reflective at the lasing wavelength of 1064 nm and highly transmitting for the 809 nm pump light. The back surface of the laser microchip that forms the output coupler has a reflectivity of 98% at 1064 nm, and is highly reflective of the pump light as well, and therefore, the laser cavity is defined solely within the gain medium. The first surface of the sapphire heat sink is not coated, and is adhered to the back surface of the Nd:YAG. The second surface of the sapphire heat sink is antireflection coated for 1064 nm.

One significant problem with applying the configuration disclosed by Nabors et al. to other lasers relates to the "Fresnel loss" that occurs at the interface between two materials with significantly different indexes of refraction (e.g. the microchip and the sapphire heat sink in the above example). As a result of such Fresnel losses, beam power is reduced each time a beam passes through the interface. In the laser configuration disclosed by Nabors et al. the laser cavity is defined within the microchip and therefore the beam makes only one traversal through the interface, that traversal occurring upon output from the laser cavity. Furthermore, the microchip and the sapphire heat sink happen to have similar indexes of refraction. If the interface were within a laser cavity, and the index of refraction differences between the microchip and the heat sink were more significant, the Fresnel loss at that interface would unfortunately become very significant. After multiple passes through the interface, even a small Fresnel loss is multiplied enough during lasing operation that the cumulative losses can substantially reduce the laser's output power, increase the laser threshold, or even prevent lasing altogether. The increased intracavity loss is particularly disadvantageous for intracavity frequency-converted systems because an intracavity loss competes with the nonlinear conversion processes and thus reduces generation of the frequency-converted radiation.

Another disadvantage with the laser described by Nabors et al. relates to coupling the coated back surface of the laser microchip to the heat sink. Because the laser microchip is coated, special care must be taken to couple it to the heat sink. Such special care requirements can increase production costs and decrease yield.

As discussed above, it can be advantageous to cool a gain medium. Additionally, in a system that includes a nonlinear crystal to convert a laser emission to a second frequency, it can be advantageous to cool the nonlinear crystal. Particularly, it can be useful to maintain the nonlinear crystal at a temperature that provides optimum frequency conversion efficiency within the crystal and it can also be useful to reduce thermal gradients that could otherwise cause amplitude instabilities as well as reduce conversion efficiency. It has been suggested to use side cooling systems similar to those used with a gain medium to cool nonlinear crystals from the side. However, such side cooling systems introduce thermal gradients within the nonlinear crystal that can reduce conversion efficiency and cause amplitude instabilities. The thermal gradient associated with side cooling the nonlinear material may also require aggressive cooling that increases cooling system requirements and costs, and can lead to other problems, such as condensation on the heat sink which could lead to increased cost and complexity of the system.

SUMMARY OF THE INVENTION

In accordance with the objectives of this invention as described above and to overcome the limitations of the prior art, the longitudinal cooling system described herein provides an apparatus and method to cool elements within a solid-state laser and thereby provide more effective operation, particularly at high powers. In one embodiment, the laser element comprises a solid-state gain medium and in that instance, more efficient lasing operation is provided by the reduced temperature. The longitudinal cooling system is particularly useful for thin solid-state laser materials having a thickness along the propagation axis of less than 5.0 mm, in which side cooling will have only limited effectiveness. In another embodiment, the laser element comprises a nonlinear frequency conversion crystal, so that the cooling system provides a more symmetric temperature distribution within the crystal, thereby improving frequency conversion efficiency, helping to maintain a stable amplitude (i.e. avoid amplitude instabilities), and reducing cooling system requirements. Additionally, the OTH can lend strength to the overall assembly because it is stronger and less susceptible to fractures than the laser element, which may comprise a fragile crystal.

A longitudinally-cooled laser element assembly comprises an optically transparent heat sink (OTH) coupled to a laser element and a heat sink. An etalon structure including a first flat surface and a second, substantially parallel flat surface is formed in the laser element and/or the OTH. In some embodiments, the etalon is balanced by providing approximately equal reflectivities on the first and second flat surfaces.

In one embodiment, the longitudinally-cooled laser element assembly comprises a laser element having an etalon structure that includes a first flat surface and a second flat surface. An optically transparent heat sink (OTH) having higher thermal conductivity than the laser element is coupled to the first flat surface of the laser element at a first interface directly along the beam path in order to provide effective heat transfer from the laser element. A heat sink, preferably comprising a high thermal conductivity material such as copper, is connected to the OTH to provide heat transfer from the OTH. The heat sink is situated as closely to the beam path as possible without blocking it or introducing substantial diffraction losses. The OTH effectively cool the laser element by drawing heat longitudinally from the laser element and conducting it through the OTH and to the heat sink where the heat is dissipated.

Advantageously, the etalon structure reduces optical losses at the interfaces between the etalon surfaces and the adjoining material, whether it be an OTH or air. As another advantage, the etalon structure can assist in selecting the desired lasing mode. In preferred embodiments, loss is further reduced by "balancing" the etalon so that the reflectivity at the interface between the OTH and the laser element is balanced by an approximately equal reflectivity on the side of the etalon opposite the interface. Because the reflectivities on both sides of the etalon are approximately equal, losses are substantially reduced. In some embodiments the reflectivity necessary to balance the etalon is created by a reflective dielectric coating on the opposite side and in other embodiments such reflectivity is created by connecting a material having a substantially equal index of refraction, such as a second OTH, to the opposite side. In other embodiments the materials on either side of the etalon may have different indexes of refraction, and the etalon can be balanced by providing a coating at one or both of the interfaces with a reflectivity that compensates for the different indexes. In other embodiments the Fresnel loss may be low enough that the etalon may be left unbalanced, and in these embodiments the second flat surface may be coated for anti-reflection.

In some embodiments the laser element comprises a gain medium, and in other embodiments the laser element comprises a nonlinear material. In the embodiment in which a nonlinear frequency conversion crystal is used, longitudinal cooling provides more uniform, symmetric temperature distribution within the nonlinear material (i.e. the reduced thermal gradients along the beam path). In turn, the symmetric temperature distribution provides more efficient frequency conversion. Particularly, the heat transfer provided by the OTH allows the temperature of the nonlinear crystal to be maintained closer to the optimum phase matching temperature across the mode volume of the laser beam, which is important due to the finite phase matching temperature acceptance of certain frequency conversion processes in nonlinear crystals. In addition, more uniform temperature distribution within the nonlinear material avoids inconsistent phase retardation, which could otherwise reduce both efficiency and amplitude stability for some nonlinear processes. In summary, longitudinal cooling of nonlinear materials using OTHs improves the efficiency of frequency conversion and also helps to maintain a stable output amplitude (i.e. avoids amplitude instabilities in the converted beam).

In some embodiments, the outer surface of the OTH (i.e. the surface distal from the interface) can be coated with any necessary coatings instead of coating the laser element. For example, if the laser element uses an OTH on one side, the optical coating on that side of the laser element can be eliminated, and if the laser element uses an OTH on both sides, then the optical coatings on both sides can be eliminated. In these embodiments, elimination of the optical coating on the laser element has cost benefits because the optical coating can be applied to the less expensive OTH rather than the more expensive laser element, thus transferring the risk of damage to the OTH and allowing the laser element to be handled without the special handling requirement of coated materials. Furthermore, since the OTH materials are typically more robust (i.e. more durable) than the crystals sometimes used for laser elements, higher yields on coating runs for OTH material are possible with vacuum film deposition processes. Also, a more durable OTH material can stabilize and protect the more fragile solid-state gain medium from damage during manufacturing and subsequent use.

The foregoing, together with other objects, features and advantages of this invention, will become more apparent when referring to the following specification, claims and the accompanying drawings.

BRIEF DESCRIPTION OF THE DRAWINGS

For a more complete understanding of this invention, reference is now made to the following detailed description of the embodiments as illustrated in the accompanying drawing, wherein:

FIG. 3 is a cross-sectional side view of a single-sided longitudinally-cooled laser assembly including a laser element cooled longitudinally on one side by an OTH and a metallic heat sink;

FIG. 4 is a cross-sectional side view of a frequency-converted laser including a laser gain medium cooled longitudinally by an OTH and a metallic heat sink, and a nonlinear material situated within the optical cavity;

FIG. 6 is a cross-sectional side view of a laser assembly including two laser elements interposed between three OTHs.

DETAILED DESCRIPTION OF THE PREFERRED EMBODIMENT

Figure 1:
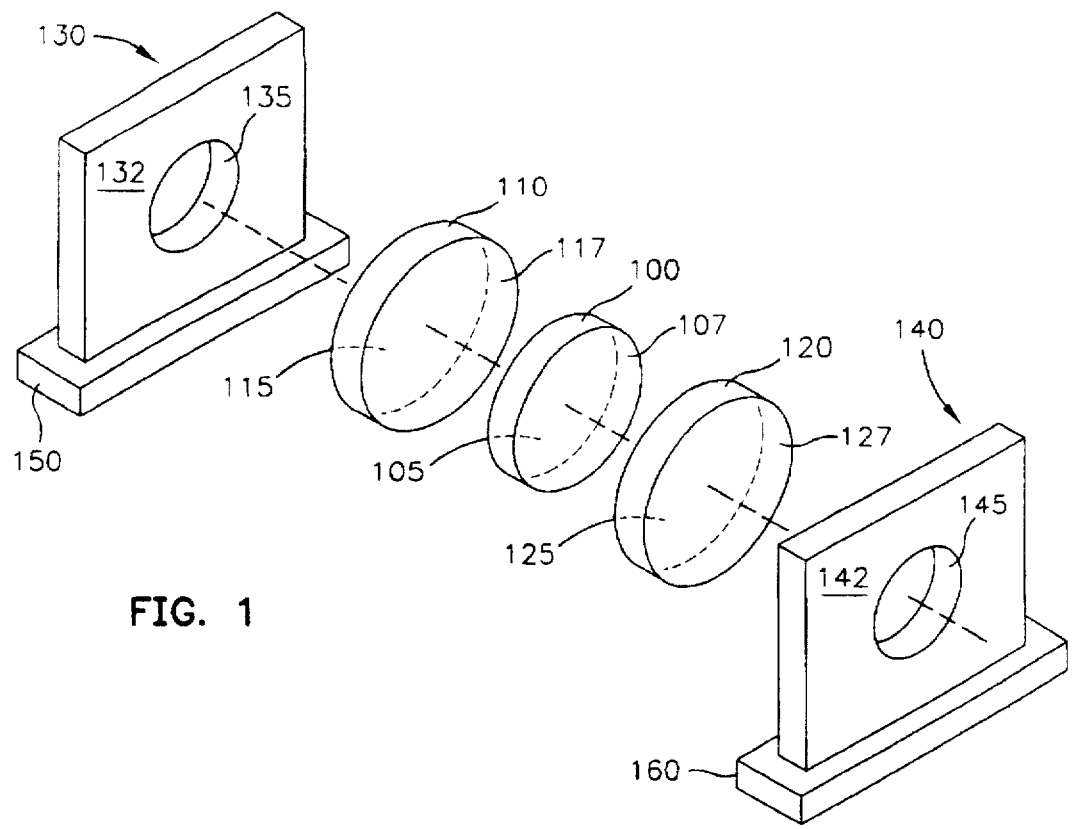
FIG. 1 is a perspective view of a double-sided longitudinally-cooled laser assembly exploded into components including a laser element and on each side of the laser element an optically transparent heat sink ("OTH"), a metallic heat sink, and a thermoelectric cooler ("TEC")

This invention is described in a preferred embodiment in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

As used herein, an "etalon" structure is defined by a pair of opposing, parallel flat surfaces. The two flat surfaces of an etalon are highly parallel and very smooth, for example the surfaces may be parallel to less than ten arc-seconds and preferably less than five arc-seconds and have a surface roughness less than fifteen Å rms and preferably five Å rms. As will be described, in some embodiments an etalon structure is formed by a laser element, and in other embodiments an etalon structure is formed by an optically transparent heat sink ("OTH"). Etalons are typically used in laser cavities to spectrally filter the laser emission.

A "balanced" etalon is an etalon in which the reflectivities at the two opposing parallel surfaces of the etalon are approximately equal. A balanced etalon will, in general, have greater transmission than an unbalanced etalon for light emission that is resonant with the etalon in accordance with the following equation:

$$\lambda_m = \frac{2l_e}{m} \quad \text{Eq. 1}$$

where $\lambda_m$ is the resonant wavelength, $l_e$ is the optical thickness of the etalon, and m is an integer.

Eq. 2 approximates the effective reflectivity ($R_{eff}$) of the etalon at each $\lambda_m$:

$$R_{\text{eff}} = \left[ \frac{\sqrt{R_1} - \sqrt{R_2}}{1 - \sqrt{R_1 R_2}} \right]^2 \qquad \text{Eq. 2}$$

where, as a fractional percentage of incident power:
$R_{\text{eff}}$ is the overall reflectivity from the etalon;
$R_1$ is the reflectivity of the first surface of the etalon; and
$R_2$ is the reflectivity of the second surface of the etalon.

From Eq. 2 it can be seen that, as the difference between the reflectivities at the surfaces $R_1$ and $R_2$ becomes smaller and smaller, the effective reflectivities $R_{\text{eff}}$ also becomes smaller and smaller until $R_1$ and $R_2$ are equal, at which point the effective reflectivity $R_{\text{eff}}$ becomes zero and (theoretically) all light at the resonant wavelengths will be transmitted through the etalon. Herein, an etalon structure is created in order to provide greater transmission (i.e. less loss) at an interface between two different materials in a laser.

If the etalon structure defined by a laser element and/or an OTH has one side with a highly reflective surface (e.g. one side of the etalon forms a mirror of a laser cavity), and the second opposite parallel side has a small finite reflectance, then Eq. 2 can be used to calculate the effective reflectivity of the mirror for resonant wavelengths. For example, if the first surface of an etalon OTH such as sapphire ($Al_2O_3$) has a highly reflective dielectric coating with a reflectivity of 99.90%, and the OTH is adhered to a gain medium such as Nd:YVO$_4$ (neodymium-doped yttrium orthovanadate), a Fresnel loss of about 1.2% is created at the interface between the OTH and the gain medium for $\pi$-polarized light. Without an etalon structure, the intracavity 1.2% loss would be very high and the effective reflectivity of the non-etalon OTH would be calculated as $0.999(1-0.012)^2 = 97.5\%$ and hence, an effective loss of 2.5% would be seen. However, since the OTH is in the form of an etalon, the effective reflectivity of the OTH for resonant wavelengths is calculated using Eq. 2 at 99.88%, and thus the effective reflectivity of the etalon differs from the loss at the highly reflective coating by only 0.02%. By using an etalon, a round trip loss of about 2.38% is avoided, which has significant impact on laser performance particularly when intracavity frequency conversion processes are employed.

Reference is now made to FIG. 1, which is an exploded, perspective view of a longitudinally-cooled laser assembly including a laser element 100 situated between a first OTH 110 and a second OTH 120.

The laser element 100 may, for example, comprise a solid-state gain medium or a non-linear crystal. Examples of solid-state gain media include rare-earth doped materials including $Nd^{3+}$, $Er^{3+}$, $Yb^{3+}$, $Tm^{3+}$, or $Ho^{3+}$ doped materials or transition metal ion (e.g. $Cr^{4+}$) doped materials. Examples of nonlinear crystals include KTP, LiNbO$_3$, and KNbO$_3$. Another example of a laser element is a composite of materials such as a solid-state gain medium and a nonlinear crystal that together form a composite laser cavity, such as that described in U.S. Pat. No. 5,574,740, assigned to the same assignee as herein.

Some materials suitable for the OTHs 110 and 120 include sapphire ($Al_2O_3$), diamond, and undoped (white) YAG, among other materials. The material selected for the OTHs should have a high optical transparency at the wavelength(s) where high transmission is desirable. Furthermore, the OTH material should have high thermal conductivity relative to the solid-state gain medium (i.e. a higher thermal conductivity than the gain medium); for example, sapphire would be appropriate for Nd:YVO$_4$ because the thermal conductivity of Nd:YVO$_4$ is 5.2 W/m-°C. and the thermal conductivity of sapphire is 40 W/m-°C. In some embodiments, it may be useful to approximately match the coefficients of thermal expansion of the OTHs and the gain medium, in order to prevent damage due to expansion differences between the two materials.

The laser element 100 has a first smooth flat surface 105 formed on a first side and a second smooth flat surface 107 formed on a second, opposite side. The first and second flat surfaces 105 and 107 have an opposing, substantially parallel relationship so that together, the first and second flat surfaces 105 and 107 form an etalon. Preferably, the two flat surfaces of the etalon are parallel to less than 10 arc-seconds and have a highly polished surface that exhibits a surface roughness of better than fifteen Å rms and preferably five Å rms.

The first OTH 110 includes a first side 115 and a second side 117. The second side has a flat, smooth surface designed to fit closely with the first surface 105 of the laser element. Preferably, the second side has a flatness sufficient for bonding to the first surface 105 by optical contact. In some embodiments, the opposing sides 115 and 117 of the OTH are formed to etalon tolerances (i.e. parallel to less than 10 arc-seconds) and have highly polished surfaces. However, in other embodiments, the first side 115 of the OTH may comprise a non-flat shape, for example the first side may comprise a curved shape (like a lens) or a flat surface angled with respect to the optical axis.

In some embodiments, such as described later with reference to FIGS. 3 and 4, it may be useful to include only the first OTH for reasons such as cost, or in order to accommodate a non-flat surface on the second surface of the laser element. However, more effective cooling can be accomplished in many embodiments by using the second OTH 120 in addition to the first OTH 110. The second OTH 120 may be identical in construction to the first OTH, and is bonded to the laser element in like manner. Particularly, the second OTH 120 includes a first side 125 and a second side 127. The first side 125 of the OTH is designed to closely contact the second surface 107 of the laser element and preferably, the first side 125 of the second OTH has a flatness sufficient for bonding to the second surface 107 of the laser element by an optical contact. In one embodiment, the second OTH comprises a material having approximately the same index of refraction as the first OTH; and preferably, the second OTH comprises the same type of material as the first OTH. In some embodiments the opposing sides 125 and 127 of the second OTH are formed to etalon tolerances (i.e. parallel to less than 10 arc-seconds) and have highly polished surfaces.

Any suitable bonding technique, preferably optical contact, is used to bond the second side 117 of the first OTH to the first surface 105 of the laser element and the first side 125 of the second OTH to the second surface 107 of the laser element. Because it is usually unnecessary to optically coat the two surfaces, they can be bonded together by conventional optical contact methods rather than the more expensive (and lower yield) techniques. In alternative embodiments, glue, epoxy, or diffusion bonding may be used to bond the OTH to the laser element. However, in some alternative embodiments it may be useful or necessary to coat one of the two surfaces to be bonded together, for example a coating at the interface between the two surfaces may be useful in order to reflect optical radiation at a predetermined wavelength. In such embodiments it is usually preferable to coat the OTH rather than the laser element due to the higher cost and more stringent handling requirements generally associated with coating a laser element.

During operation of a laser, heat will be produced within the laser element. The OTH conducts heat away from the laser element and into a heat sink where it is dissipated. In the embodiment of FIG. 1, a first heat sink 130 including a first metallic section 132 is thermally coupled to the first OTH 110 by any available means, such as thermally conductive epoxy, solder or other means. Similarly, a second heat sink 140 including a first metallic section 142 is thermally coupled to the second OTH 120. The metallic sections 132 and 142 have a high thermal conductivity, and therefore copper or aluminum are preferred materials. In the preferred embodiment, an aperture is provided in the metallic section of each heat sink in order to allow passage of optical radiation; specifically an aperture 135 is provided in the first heat sink 130 and an aperture 145 is provided in the second heat sink 140. Each aperture has an appropriate shape and a sufficient size to accommodate the laser radiation passing therethrough. In order to avoid diffraction losses, the diameter of each aperture should be at least two to three times the widest diameter of the optical radiation passing therethrough, except for a pump beam focused into a solid-state gain medium, in which case the aperture need only be slightly larger than the widest diameter of the pump beam. For thermal reasons related to cooling the OTH, each aperture 135 and 145 should be as small as possible. In any particular embodiment, thermal considerations and optical losses can be balanced in order to design an aperture with the appropriate shape and size. Furthermore, although the aperture is shown as circular, it could have other shapes. In alternative embodiments, the metallic heat sink could be coupled anywhere on the exposed surfaces of the OTH, for example on the edge of the OTH rather than on its face.

Furthermore, other types of heat sinks rather than the metallic heat sink can be used. For example, in some alternative embodiments, the heat sink could comprise air and therefore one or both of the metallic heat sinks could be eliminated so that the OTH is air-cooled, which would reduce cost. In such embodiments, a fan may be utilized to more effectively cool the OTH.

Although some heat will dissipated by air contact with the OTH and the metallic heat sink, in many embodiments it will be useful to provide more aggressive heat dissipation. The metallic sections 132 and 142 have a high thermal conductivity to conduct heat to heat exchangers 150 and 160, which further dissipate the heat. Specifically, a first heat exchanger 150 is thermally coupled to the first metallic section 132 and a second heat exchanger 160 is coupled to the second heat metallic section 142. The heat exchangers may be devices such as a fan and/or heat fins formed in the metallic sections or as a separate component, but for more effective cooling each heat exchanger comprises a thermo-electric cooler ("TEC"). Preferably, each TEC has sufficient cooling power to maintain its respective metallic heat sink at a substantially constant temperature throughout its volume.

Figure 2:
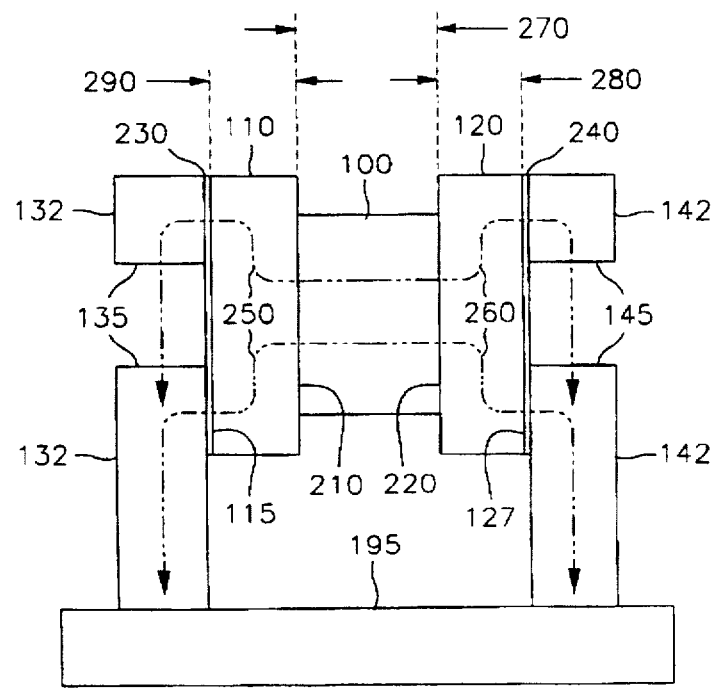
FIG. 2 is a cross-sectional side view of a double-sided longitudinally-cooled laser assembly including a laser element cooled longitudinally on both sides by an OTH and a metallic heat sink.

Although two separate heat exchangers are shown in FIG. 1, in other embodiments such as shown in FIG. 2, a single heat exchanger may be connected to both the first and second heat sinks. Furthermore, if the heat transfer requirements of the laser element can still be met to provide a maximum predetermined temperature within the laser element, one or both of the heat exchangers may be omitted, and/or one or both of the metallic heat sinks may be omitted. For example, if the heat transfer requirements on one side are less than the other, the heat exchanger on that side may be omitted.

Reference is now made to FIG. 2, which is a cross-sectional side view of a longitudinally-cooled laser assembly in which the first OTH 110 and the laser element 100 are bonded together at a first interface 210, and the second OTH 120 and the laser element 100 are bonded together at a second interface 220. The bonding at both interfaces is preferably by optical contact although other means, such as glue, epoxy, or diffusion bonding may be used.

The first side 115 of the first OTH has a coating 230 formed thereon, which may be reflective, anti-reflective, or a combination of reflective and anti-reflective in order to transmit or reflect optical radiation at a predetermined wavelength as appropriate for the intended application. Similarly, the second OTH 120 on its second side 125 has a coating 240 formed thereon, which may be reflective, anti-reflective, or a combination of the two in order to transmit or reflect optical radiation as appropriate for the intended application. The coatings 230 and 240 may comprise dielectric layers. Advantageously, coating one or both of the OTHs instead of the laser element is usually easier (and therefore less costly) from a manufacturing standpoint. Furthermore, coating one or both of the OTHs instead of the laser element reduces the risk of damage to the laser element which is typically more expensive and more fragile.

Figure 7:
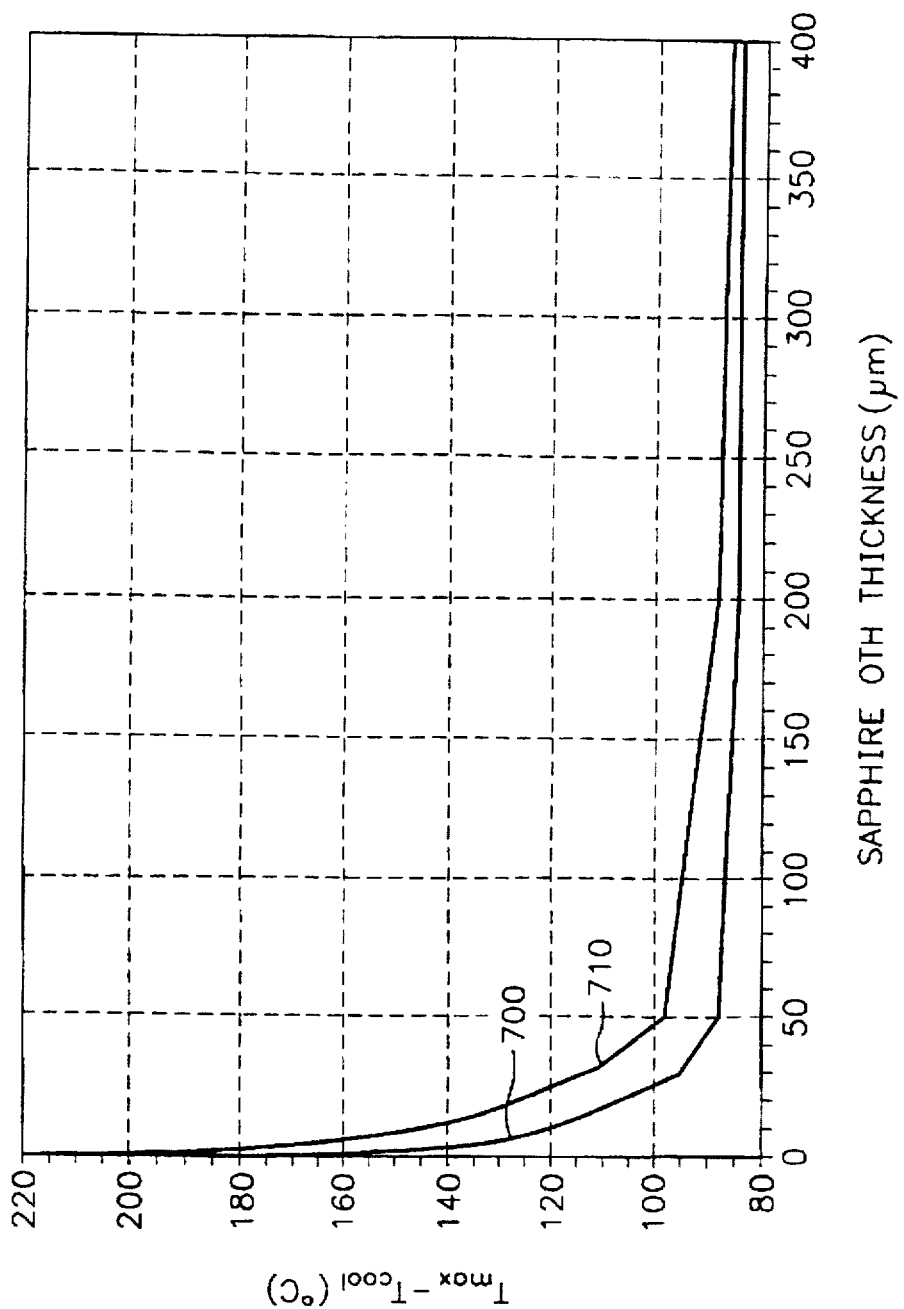
FIG. 7 is a graph depicting the results of calculations to determine the maximum temperature difference between the interior of the laser element and the heat sink as a function of OTH thickness.

In FIG. 2, heat flow is illustrated by arrows 250 and 260. Specifically, heat will flow longitudinally to the left as illustrated by arrows 250 and also to the right as illustrated by arrows 260. Particularly, the heat generated in the laser element 100 by, for example absorption of optical radiation, flows from the laser element, into the OTHs, and then into the heat sinks. Each OTH and heat sink should be designed to maximize heat flow from the laser element. Preferably, the thickness of the OTH along the optical axis (which could be the optical axis of an optical cavity or simply the direction in which a beam is propagating) is chosen to minimize the thermal resistance (and associated temperature difference) between the laser material and heat sink, which has a higher thermal conductivity. An approximation for the thermal resistance of the OTH is $R_{th}=l/kA$ where l is the distance between the lasing spot and the metallic heat sink, k is the thermal conductivity, and A is the cross-sectional area in the plane perpendicular to the direction of heat flow. Determination of the proper OTH thickness for thermal considerations should balance several factors including lasing mode size, laser material thickness, and heat sink aperture size. If the OTH thickness is made too large, the thermal resistance increases linearly with thickness. However, if the thickness is made too small, the cross-sectional area becomes small and the thermal resistance again increases. Generally, for embodiments using sapphire as an OTH material, it has been found that a thicknesses in the range of at least 0.15 mm to 1.0 mm will provide satisfactory performance. The results of a finite element analysis that solves thermal heat flow equations to show the variation in peak temperature ($T_{max}-T_{cool}$) as a function of OTH thickness for one exemplary embodiment are shown in FIG. 7 and described in connection therewith.

In addition to considering the thermal conductivity properties of an OTH material when determining the optimum thickness, the optical scattering properties at the lasing wavelength should also be considered. For example, in embodiments in which the OTH comprises optical quality sapphire or YAG, the optical scattering is sufficiently low at near-infrared and visible wavelengths that scattering losses can be neglected for OTH thicknesses less than 500 µm. For example, although CVD (Chemical Vapor Deposition) diamond has a higher thermal conductivity, unfortunately it also has significant optical scattering properties at near infrared and visible wavelengths, which makes CVD diamond less desirable at those wavelengths than sapphire or white YAG.

A first intracavity etalon 270 is defined between the first interface 210 and the second interface 220 by substantially flat, smooth, parallel surfaces. In embodiments in which the etalon 270 is balanced, the interfaces 210 and 220 have approximately equal Fresnel losses. In the preferred embodiment, the first and second OTHs comprise identical materials so that their indexes of refraction are equal and therefore their Fresnel losses are equal. In alternative embodiments, the first and second OTHs may comprise different materials having approximately equal indexes of refraction, which also provide approximately equal Fresnel losses. In still other alternative embodiments, the first and second OTHs may comprise different materials having different indexes of refraction, and one or both of the interfaces 210 and 220 could include a coating formed to balance the Fresnel losses (i.e., provide approximately equal Fresnel losses) at the two interfaces 210 and 220.

Under the condition that the Fresnel losses are approximately equal, the etalon 270 is balanced, and therefore resonant optical radiation can pass through both interfaces 210 and 220 in the laser element with substantially no loss. Preferably the bonding methods used are identical at both interfaces so that each interface is as identical to the other as possible.

In alternative embodiments, it may be useful to provide the second OTH 120 with an etalon structure having parallel, opposed surfaces. In such embodiments, a second etalon 280 is defined between the second interface 220 and the outer coating 240 on the second side of the second OTH. To reduce losses further, the second etalon 280 could be balanced (i.e., the outer coating 240 could be designed to balance the Fresnel loss at the second interface 220 at a predetermined wavelength). In alternative embodiments where the second etalon 280 is used in combination with the first etalon 270, optical radiation at predetermined wavelengths can pass substantially loss-free through the first interface 210, the second interface 220, and the outer coating 240.

In still other alternative embodiments, it may be useful to provide the first OTH 110 with an etalon structure. In such embodiments, a third etalon 290 is defined between the outer coating 230 of the first OTH and the first interface 210. To reduce losses further, the third etalon 290 may be balanced (i.e., the coating 230 may be designed to balance the Fresnel loss at the first interface 210 at a predetermined wavelength or wavelengths). In alternative embodiments where the third etalon 290 is used in combination with the second etalon 280 and first etalon 270, optical radiation at predetermined wavelengths can pass substantially loss-free through the entire assembly, including the outer coating 230, the first interface 210, the second interface 220, and the outer coating 240. In alternative embodiments the outer coating 230 of the first OTH may be highly reflective (e.g. to form one mirror of a laser cavity), and in these embodiments the third etalon 290 substantially reduces the loss at the first interface 210 at resonant wavelengths, as described previously.

In FIG. 2, the metallic heat sinks 132 and 142 are thermally coupled to draw heat longitudinally from the OTHs 110 and 120, and supply it to a heat exchanger 195 that is thermally coupled to both metallic heat sinks 132 and 142.

Reference is now made to FIG. 3, which is a cross-sectional side view of an assembled single-sided laser element assembly in which the first OTH 110 and the laser element 100 are connected together at the first interface 210. In the single-sided configuration of FIG. 3, the laser element 100 has the structure of an etalon 300 defined between the first interface 210 and the second flat surface 107. Preferably, the etalon 300 is balanced, which means that the Fresnel loss at the interface 210 is approximately equal to the reflectivity at the surface 107. In order to make the reflectivity approximately equal, a coating 310 may be formed on the second surface 107 of the laser element. The coating 310 "balances" the Fresnel loss at the first interface 210. The coating 310 may, for example comprise a dielectric coating having a predetermined reflectivity at the wavelength of interest. However, in some embodiments the Fresnel loss may be low enough that, as discussed previously, the effective reflectivity ($R_{eff}$) according to Eq. 2 is still very small, and therefore the coating 310 may comprise an anti-reflective coating rather than a reflective coating.

A Fresnel loss is defined as the reflective loss that occurs at an interface between two materials having different indexes of refraction. At the first interface 210, an optical beam will suffer a Fresnel loss that is directly related to the difference between the index of refraction of the OTH 110 and the index of refraction of the laser element 100. The Fresnel loss ($R_{FRESNEL}$) at the first interface 210 for a beam at normal incidence can be approximated by the following equation:

$$R_{FRESNEL} = \left( \frac{n_2 - n_1}{n_1 + n_2} \right)^2 \qquad \text{Eq. 3}$$

wherein $n_1$ is the index of refraction of the OTH and $n_2$ is the index of refraction of the laser element.

In order to balance the etalon 300 using the coating 310, a thin film dielectric coating can be applied to the surface 107 to provide a reflectivity approximately equal to the Fresnel loss at the interface 210 at a predetermined wavelength. Because this reflectivity value approximates the Fresnel loss, a balanced etalon structure is formed between the first interface 210 and the coating 310, and as a result, optical radiation resonant with the balanced etalon passes substantially loss-free through both surfaces of the etalon.

In alternative embodiments, it may be useful to form a second etalon 320 in the first OTH 120 between the first interface 210 and the outer coating 230 on the first side of the first OTH. In such embodiments, the outer coating 230 on the OTH would be designed to balance the Fresnel loss at the first interface 210. In some embodiments, both the second etalon 320 and the first etalon 300 may be implemented. In other embodiments the second etalon 320 may be implemented in the OTH while the first etalon 300 is not implemented in the laser element, and in these embodiments the distal surface 107 of the laser element may comprise an alternative shape such as a curved shape to provide focusing power or a flat angled surface to reflect predetermined wavelength(s).

In some embodiments that include the second etalon 320, the outer coating 230 may be highly reflective, while the opposite side of the second etalon is highly transmissive. For example the outer coating 230 may comprise one of the end mirrors in a laser cavity. In these embodiments the second etalon 320 operates to substantially reduce the loss at the first interface 210 at resonant wavelengths, as described previously, even though the etalon 320 appears to be "unbalanced".

The OTH may be utilized in a variety of configurations. For example, in one preferred embodiment as shown in FIG. 3, a laser element could be cooled on one side, and in other preferred embodiments as shown in FIGS. 1 and 2, a laser element could be cooled on both sides. In an embodiment in which a laser cavity has two laser elements (e.g. a gain medium and a nonlinear crystal) the first laser element may be cooled on one or both sides and the second laser element may be cooled on one or both sides, or not at all. Furthermore, additional devices for cooling the laser element may be employed: for example, conventional side-cooling apparatus may be employed in addition to one or two OTHs. In other embodiments, an OTH-cooled laser element may be situated externally from the cavity. The cooling provided by the OTHs is particularly useful at high powers, and can be very effective, particularly if the laser element is thin.

Some laser configurations that can be applied for use with one or more OTHs for high power operation are disclosed in U.S. Ser. No. 08/760,702, filed Dec. 5, 1996 entitled "Efficient Frequency Converted Laser" by Hargis and Nelte, and assigned to a common assignee, which is expressly incorporated by reference herein. That application discloses frequency-converted lasers such as intracavity-doubled solid-state lasers that use Nd:YVO$_4$ as a gain medium and a nonlinear crystal for frequency doubling.

Figure 5:
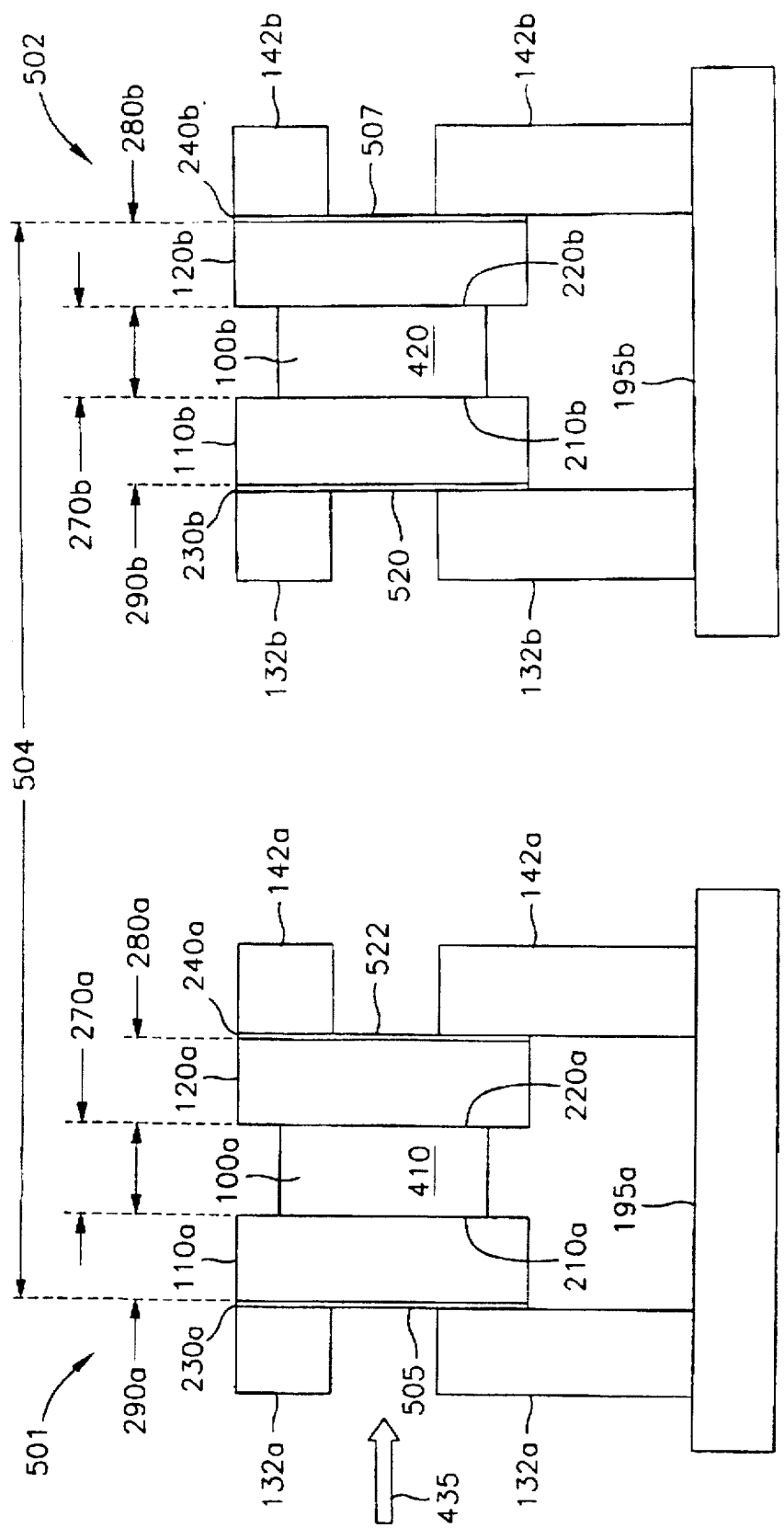
FIG. 5 is a cross-sectional side view of a frequency-converted laser including a laser gain medium cooled longitudinally on both sides by an OTH, and an intracavity nonlinear material also cooled by an OTH.

FIGS. 4 and 5 disclose exemplary embodiments of a solid-state laser in which intracavity laser elements are longitudinally-cooled cooled by an OTH. In the embodiments described with reference to FIGS. 4 and 5, heat can be an unwanted by-product of absorption of optical radiation from the pump source, absorption of laser emission, and frequency conversion, for example. The OTH is very effective at conducting away such heat.

FIG. 4 is a schematic diagram of a laser including an optical cavity 400 defined between an front mirror 405, which is formed as part of the coating 230, and an back mirror 407. In FIG. 4, the laser element 100 comprises a solid-state gain medium 410 such as a Nd$^{3+}$ doped crystal or a Cr$^{4+}$ doped crystal situated within the optical cavity to provide a fundamental laser emission. One preferred gain medium 410 comprises Nd:YVO$_4$. A nonlinear material 420 is also situated within the optical cavity to convert the fundamental laser emission to a converted frequency, which in the preferred embodiment is a doubled frequency. Examples of nonlinear optical materials include KTP, LiNbO$_3$, and KNbO$_3$. Using conventional techniques, the microlaser shown in FIG. 4 can provide a high-power frequency-doubled output.

The gain medium 410 is optically pumped by a pump source 430 such as a laser diode. The optical pump radiation 435 from the laser diode, which diverges rapidly, may be focused into the gain medium 410, or the optical radiation may be delivered by an optical fiber. Alternatively the laser diode may be situated closely enough to directly pump the gain medium without the need to focus the pump radiation (e.g. butt-coupled). The pump source 430 may comprise, for example a single laser diode, an array of laser diodes, or a laser diode bar.

The front mirror 405, which is formed by the first optical coating 230, is highly reflective at the fundamental laser emission, and highly transmissive (anti-reflective) at the wavelength of the pump radiation. In the embodiment of FIG. 4, the front mirror 405 is formed by the first optical coating 230. Also, in some embodiments, the back mirror 407 may be formed directly on the surface of the nonlinear material and/or the coating 240 on the interior surface of the gain medium 410 and an interior coating 440 on an interior surface 445 of the nonlinear material may be coated for high transmission at the fundamental laser emission. In some other embodiments, the interior coating 240 may have a reflectivity approximately matching the reflectivity at the first interface 210 in order to balance the etalon formed by the gain medium 410.

In one exemplary embodiment of the nonlinear material 420, the interior surface 445 may comprise an angled reflector for the converted beam of laser radiation such as disclosed in U.S. Ser. No. 08/760,702, filed Dec. 5, 1996, entitled "Efficient Frequency Converted Laser", which has been incorporated by reference herein. Such an angled reflector operates to reflect converted radiation from the optical cavity at an angle with respect to the optical axis of the cavity.

Reference is now made to FIG. 5 which is an example of a laser including two doubled-sided longitudinally-cooled laser assemblies, including a first assembly 501 and a second assembly 502. An optical cavity 504 is defined between the front mirror 505 and an back mirror 507. The solid-state gain medium 410 is situated within the first assembly 501 in the optical cavity 504, and provides the fundamental laser emission. The nonlinear material 420 is situated in the second assembly 502 within the optical cavity, and is oriented to convert the fundamental laser emission to a converted frequency, preferably to a doubled frequency. The laser is pumped with optical radiation 435 from the pump source 430 (FIG. 4).

The double-sided OTH configuration shown in FIG. 5 is very useful to dissipate the heat generated by high intensities within a high power laser; particularly, optical pumping at high intensities can generate a great deal of heat. Furthermore, although the absorption coefficient may be small, the high intensity of the fundamental laser emission can create significant heat. Also, the frequency conversion process generates heat in the nonlinear material. Cooling the gain medium 410 effectively using the double-sided OTH configuration as illustrated increases the lasing efficiency and prevents damage, and allows higher power operation to be maintained. Cooling the nonlinear material 420 using the double-sided OTH configuration ensures efficient, reliable frequency conversion.

In the first assembly 501, the solid-state gain medium 410 is situated between a first OTH 110$a$ and a second OTH 120$a$. A etalon may be defined in each of the gain medium 410, the first OTH 110$a$ and/or the second OTH 120$a$. In the preferred embodiment, a first etalon 270$a$ is defined in the gain medium 410 between the OTHs: particularly, the first etalon 270$a$ is defined between a first interface 210$a$ and a second interface 220$a$. In the preferred embodiment, the first and second OTHs both comprise the same material—sapphire, and therefore the etalon 270$a$ is automatically balanced.

In some embodiments, the second OTH has an etalon structure, so that a second etalon 280$a$ is defined between the interior-facing coating 240$a$ and the interface 220$a$ with the gain medium. In those embodiments, the second etalon 280$a$ may be balanced by designing an interior coating 240$a$ with a reflectivity for the fundamental laser emission that matches the Fresnel loss at the second interface 220$a$. In other embodiments the interior coating 240$a$ may be designed for antireflection.

In still other embodiments, the first OTH 110$a$ has an etalon structure, so that a third etalon 290$a$ is defined between the coating 230$a$ and the first interface 210$a$.

In any particular embodiment, the first, second, and third etalons may be employed in any combination, which allows the laser assembly to be designed to meet predetermined cost and performance criteria. For example, one embodiment may include only the first etalon, and another embodiment may include only the second and third etalons. Another embodiment may include only the third etalon. It should be clear that the advantages provided by the etalon structure reduce loss at each surface of the assembly.

In the second assembly 502, the nonlinear material 420 is situated between the first OTH 110$b$ and the second OTH 120b. As with the first assembly, an etalon may be defined in each of the nonlinear material 420, the first OTH 110b and/or the second OTH 120b. In the preferred embodiment, a first etalon structure defines an etalon 270b between the OTHs: particularly, the etalon 270b is defined between a first interface 210b and a second interface 220b. Preferably, both the first and second OTHs comprise sapphire or both comprise undoped YAG, and therefore the etalon 270b is balanced. In some embodiments, the first OTH has an etalon structure, so that a second etalon 290b is defined in the first OTH 110b between the interior-facing coating 230b and the interface 210b with the nonlinear material. In some embodiments, the second etalon 290b may be balanced by designing the interior coating 230b with a reflectivity for the fundamental laser emission that matches the Fresnel loss at the first interface 210b. In other embodiments the interior coating 230b may be designed for antireflection. In still other embodiments, the second OTH 120b has an etalon structure, so that a third etalon 280b is defined between the outer coating 240b and the second interface 220b.

In the first assembly 501, a first metallic heat sink 132a is thermally coupled to the first OTH 110a, and a second metallic heat sink 142a is thermally coupled to the second OTH 120a. The first and second metallic heat sinks 132a and 142a are thermally coupled to a heat exchanger 195a, which is preferably a thermoelectric cooler. Likewise in the second assembly 502, a first metallic heat sink 132b is thermally coupled to the first OTH 110b, and a second metallic heat sink 142b is thermally coupled to the second OTH 120b. The first and second metallic heat sinks 132b and 142a are thermally coupled to a heat exchanger 195b, which is preferably a thermoelectric cooler. In alternative embodiments, one of the metallic heat sinks in each assembly can be eliminated, which is particularly cost effective if the laser element is thin or if allowed by its heat transfer requirements. For example, in an alternative embodiment in which the gain medium 410 is thin (e.g. 250 μm) the first metallic heat sink 132a can be eliminated so that the first OTH 110a is air-cooled, while keeping the second metallic heat sink 142a for aggressive heat transfer. In still other alternative embodiments, both of the metallic heat can be eliminated so that the OTHs on both sides are air-cooled.

In FIG. 5, the front mirror 505 is formed in the first optical coating 230a and the back mirror 507 is formed in the second optical coating 240b. Both the input and back mirrors include a coating that is highly reflective at the fundamental laser emission. In addition, the first optical coating 230a is transmissive (i.e. antireflective) at the pump wavelength, and the second optical coating 240b is transmissive (i.e. anti-reflective) at the converted wavelength.

In the first assembly 501, the interior facing surface of the second OTH 120a includes a coating 240a having high transmission at the fundamental laser emission. Similarly, in the second assembly, the interior facing surface of the first OTH 110b also includes a coating 230b having high transmission at the fundamental laser emission. However, in addition, the coating 230b on the interior-facing surface of the first OTH may be highly reflective at the converted wavelength.

In one exemplary embodiment of the second assembly, an interior surface 520 of the first OTH 110b may comprise an angled reflector for the converted beam of laser radiation such as disclosed in U.S. Ser. No. 08/760,702, filed Dec. 5, 1996, entitled "Efficient Frequency Converted Laser", which has been incorporated by reference herein. Such an angled reflector operates to reflect converted radiation from the optical cavity at an angle with respect to the optical axis of the cavity. In an alternative embodiment, an interior surface 522 of the second OTH 120a may comprise an angled reflector for the converted beam of laser radiation.

FIG. 6 is a side view of an alternative embodiment of a laser element assembly in which a second laser element 600 and a third OTH 610 are added to the laser assembly that already includes the first OTH 110, the first laser element 100, and the second OTH 120. The third OTH is constructed like the first and second OTHs. The second laser element, like the first laser element, may comprise a gain medium or a nonlinear material. The second laser element may comprise the same material as the first laser element, or it may be different. For example, the first laser element may comprise a gain medium and the second laser element may comprise a nonlinear crystal. In addition to cooling the laser element, many OTHs can also provide structural strength because the OTHs are usually less susceptible to fracture than the crystals typically used for laser elements.

Many combinations of etalons may be used with the embodiment of FIG. 6 to provide a low loss laser element assembly, and it is particularly useful if alternating structures in the assembly comprise an etalon. For example the first and second laser elements may each comprise an etalon structure, or in another example, the first, second, and third OTHs may each comprise etalons. In other embodiments, additional laser elements or OTHs may comprise an etalon. For example, all laser elements and all OTHs may comprise an etalon.

The configuration shown in FIG. 6 could be useful in various embodiments. For example, both the first and second laser elements may comprise a gain medium, thereby providing an effective gain length equal to the sum of the thicknesses of the two gain medium elements while retaining the benefits of longitudinal cooling for both. In other embodiments, additional laser elements may be alternated in like manner with the OTH: for example, a third laser element (not shown) may be coupled to the third OTH, a fourth OTH (not shown) may be coupled to the third laser element, and so forth for as many laser elements and OTHs as desired. The additional laser elements in such an assembly need not comprise the same material. For example, one laser element may comprise a gain medium, and another may comprise a nonlinear material. Or, one laser element may comprise one type of gain medium, and another laser element may comprise another type of gain medium.

Reference is now made to FIG. 7 which is a graphical depiction that shows calculated variations in peak temperature ($T_{max}-T_{cool}$) of the gain medium as a function of OTH thickness for an exemplary embodiment of a laser element assembly 501 (FIG. 5). The calculated values used to plot the graph are set forth in Table A. These values were calculated using a finite element analysis to solve thermal heat flow equations for an exemplary embodiment in which the laser element 410 (FIG. 5) is assumed to be 1 a.t. % Nd:YVO$_4$ with a thickness of 250 μm and a diameter of 3.0 mm. The laser element 410 is pumped by a laser diode that provides optical radiation 435 (FIG. 5) at 809 nm with a power of 10.0 watts and a pump spot diameter of 250 μm. The first and second OTHs 110a and 120a are assumed to be sapphire with equal thicknesses and a diameter of 4.0 mm. Both metallic heat sinks 132a and 142a are assumed to maintain a constant temperature of 20° C., and the second aperture 145 is assumed to have a diameter of 750 μm.

The graph lines in FIG. 7 show variations in peak temperature ($T_{max}-T_{cool}$) as a function of OTH thickness (in μm). Specifically, graph line 700 shows the calculted results if the diameter of the first aperture 135 is 500 μm, and graph line 710 shows the calculated results if the diameter of the first aperture 135 is 1000 µm. It should be noted that the analysis shown in the graph of FIG. 7 and the corresponding values in Table A have not been verified experimentally, and actual results for an implemented embodiment may vary.

TABLE A

| Substrate Thickness | 500 µm diameter hole in entrance heat sink | | 1000 µm diameter hole in entrance heat sink | |
| --- | --- | --- | --- | --- |
| µm | $T_{max}$ (°C.) | $T_{max} - T_{cool}$ | $T_{max}$ (°C.) | $T_{max} - T_{cool}$ |
| 0 | 196 | 176 | 236 | 216 |
| 3 | 167 | 147 | 198 | 178 |
| 5 | 156 | 136 | 186 | 166 |
| 8 | 147 | 127 | 175 | 155 |
| 10 | 142 | 122 | 167 | 147 |
| 15 | 132 | 112 | 153 | 133 |
| 30 | 116 | 96 | 131 | 111 |
| 50 | 108 | 88 | 118 | 98 |
| 100 | 106.5 | 86.5 | 114 | 94 |
| 150 | 105 | 85 | 110 | 90 |
| 200 | 104 | 84 | 107 | 87 |
| 400 | 104 | 84 | 105 | 85 |
| 1200 | 105 | 85 | 105 | 85 |
| 2500 | 106 | 86 | 106 | 86 |

Other embodiments and modifications of this invention may occur to those of ordinary skill in the art in view of these teachings. For example, the OTHs on the side distal from the laser element, (e.g. in FIG. 1, the first side 115 of the first OTH and the second side 127 of the second OTH) may not be flat. Instead, one or more of the OTHs may have an angled shape or a curved shape, which may be convex or concave. For example, a curved shape can be used to shape the lasing mode within the optical cavity, and the angled shape can be used to direct converted radiation from the optical cavity. Therefore, this invention is to be limited only by the following claims, which include all such embodiments and modifications when viewed in conjunction with the above specification and accompanying drawings.

What is claimed is:

1. A laser assembly comprising:

an optical cavity;

a laser element having a first surface and a second surface, said laser element located within said optical cavity;

an optically transparent heat sink (OTH) located within said optical cavity, having a first surface and a second surface, said second surface of said OTH coupled at an interface to said first surface of said laser element; and wherein at least one of said laser element and said OTH forms an etalon structure wherein said first and second surfaces of said etalon structure are approximately flat and parallel to each other, with one of said flat surfaces being located at said interface of said laser element and said OTH, such that said etalon structure produces constructive interference effects which minimize optical losses at said interface thereby improving laser efficiency.

2. The laser assembly of claim 1 wherein said laser element comprises a solid-state gain medium.

3. The laser assembly of claim 1 wherein said laser element comprises a nonlinear material.

4. The laser element assembly of claim 1, wherein said first flat surface and said second flat surface have approximately equal reflectivities so that said etalon structure is approximately balanced.

5. The laser assembly of claim 1, and further comprising a heat sink coupled to the OTH.

6. The laser assembly of claim 5, and further comprising:

a thermoelectric cooler coupled to said heat sink; and wherein said heat sink comprises a metallic material.

7. The laser assembly of claim 1, and further comprising:

a second OTH having a first side and a second side opposite thereto, said first side of said second OTH being coupled to said second surface of said laser element.

8. The laser assembly of claim 7 wherein said first and second OTHs comprise substantially identical materials having substantially identical indexes of refraction so that said etalon structure is approximately balanced.

9. The laser assembly of claim 10 wherein said first OTH has a first index of refraction, said second OTH has a second index of refraction, and said first and second indexes of refraction are substantially equal so that said etalon is balanced.

10. An optically-pumped laser comprising:

a laser cavity;

a pump source;

a solid-state gain medium situated within said laser cavity and having a first surface and a second surface, said solid state gain medium positioned to be pumped by said pump source;

a first optically transparent heat sink (OTH) situated within said laser cavity, having a first surface and and a second surface, said surface of said OTH coupled to said first surface of said solid state gain medium at a first interface; and wherein at least one of said solid-state gain medium and said OTH forms an etalon structure wherein said first and second surfaces of said etalon structure are approximately flat and parallel to each other, with one of said flat surfaces being located at said first interface of said solid state gain medium and said OTH, such that said etalon structure produces constructive interference effects which minimize optical losses at said first interface thereby improving laser efficiency.

11. The optically-pumped laser of claim 10 and further comprising a heat sink coupled to the OTH.

12. The optically-pumped laser of claim 10, wherein said first interface has a first reflectivity, and further comprising:

a reflector formed on said second surface of the gain medium, said reflector having a second reflectivity that is approximately equal to said first reflectivity so that said etalon structure is approximately balanced.

13. The optically-pumped laser of claim 10 wherein said OTH comprises an etalon structure.

14. The optically-pumped laser of claim 13, wherein said laser element comprises said etalon structure and wherein said first interface has a first reflectivity, and further comprising:

a reflector formed on said first side of said OTH having a second reflectivity that is approximately equal to said first reflectivity, so that said etalon structure in said OTH is approximately balanced.

15. The optically-pumped laser of claim 10, and further comprising:

a second OTH having a first side and a second side opposite thereto, said first side of said second OTH being coupled to said second surface of said laser element.

16. The optically-pumped laser of claim 15 wherein said first OTH comprises an etalon structure and said second OTH comprises an etalon structure.

17. The optically-pumped laser of claim 15 wherein said laser element comprises said etalon structure, said OTH has a first index of refraction, said second OTH has a second index of refraction, and said first and second indexes of refraction are approximately equal so that said etalon structure is approximately balanced.

18. The optically-pumped laser of claim 15 wherein said laser element comprises said etalon structure, and said first and second OTHs comprise substantially identical materials having substantially equal indexes of refraction so that said etalon structure in said gain medium is substantially balanced.

19. The optically-pumped laser of claim 10:
wherein said laser cavity comprises a front mirror and a back mirror; and
wherein said front mirror is formed on said first side of said first OTH.

20. The optically-pumped laser of claim 10, and further comprising a nonlinear crystal situated within said laser cavity.

21. A method of longitudinally cooling a laser element within an optical cavity of a laser, comprising the steps of:
a) providing an optically transparent heat sink (OTH) coupled to the laser element at an interface within said optical cavity, wherein at least one of the laser element and the OTH forms an etalon structure including a first flat surface and a second flat surface in an opposed, substantially parallel relationship, with said first flat surface at said interface, such that said etalon structure produces constructive interference effects which minimize optical losses at said interface thereby improving laser efficiency;
b) operating said laser, thereby producing heat within said laser element;
c) allowing said heat to flow longitudinally across said interface from the element and into the OTH; and
d) dissipating said heat from the OTH.

22. The method of claim 21 wherein said step a) includes providing a laser element that comprises a solid-state gain medium, and said step b) includes optically pumping the solid state gain medium.

23. The method of claim 21 wherein said step a) includes providing a laser element that comprises a nonlinear material, and step b) includes frequency converting a fundamental laser emission.

24. The method of claim 21 wherein said laser element comprises said etalon structure, and wherein said interface between the laser element and the OTH has a first reflectivity, and further comprising the step of:
providing a second reflectivity on the laser element approximately equivalent to said first reflectivity so that said laser element forms a substantially balanced etalon.

25. The method of claim 21, wherein said step d) includes air-cooling the OTH.

26. The method of claim 21, wherein said step d) includes conducting heat from the OTH through a metallic heat sink.

27. The method of claim 26, wherein said metallic heat sink is coupled to conduct said heat to a thermoelectric cooler, and which dissipating said heat in said thermoelectric cooler.

28. The method of claim 21 and further comprising the steps of:
e) providing a second OTH coupled to said laser element, wherein at least one of said second OTH, said first OTH and said laser element has an etalon structure including a first flat surface and a second flat surface in an opposed, substantially parallel relationship;
f) allowing a portion of said heat produced within said laser element to flow from said laser element and into said second OTH; and
g) dissipating said heat from said second OTH.

29. The method of claim 28 wherein said laser element comprises said etalon structure, and further comprising the step of providing an index of refraction for said second OTH that is approximately equal to an index of refraction of said first OTH so that said laser element forms a substantially balanced etalon.

30. The method of claim 28, and further comprising the steps of providing a first etalon structure in said first OTH and a second etalon structure in said laser element.

31. A longitudinally cooled laser comprising:
a pump source;
a laser cavity positioned to receive optical radiation from said pump source;
a solid-state gain medium situated within said laser cavity and having a first surface and a second surface;
at least one optically transparent heat sink (OTH) situated within said laser cavity, having a first surface and a second surface, one of said surfaces of said OTH coupled to one of said surfaces of said solid state gain medium forming a first interface, thereby allowing heat generated in said solid state gain medium during lasing to flow longitudinally across said interface into said OTH;
wherein at least one of said solid-state gain medium and said OTH forms an etalon structure wherein said first and second surfaces of said etalon structure are approximately flat and parallel to each other, with one of said flat surfaces being located at said first interface of said solid state gain medium and said OTH, such that said etalon structure produces constructive interference effects which minimize optical losses at said first interface thereby improving laser efficiency; and
a second heat sink thermally coupled to said at least one OTH, to longitudinally cool said laser.

* * * * *